United States Patent
Furudate et al.

(10) Patent No.: US 6,600,246 B2
(45) Date of Patent: *Jul. 29, 2003

(54) VIBRATION GENERATING DEVICE HAVING A WEIGHT CAULKED TO A SHAFT

(75) Inventors: Toshio Furudate, Fukushima-ken (JP); Yuji Inada, Fukushima-ken (JP); Shinichi Hosobuchi, Fukushima-ken (JP)

(73) Assignee: Alps Electric Co., Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/911,312

(22) Filed: Jul. 23, 2001

(65) Prior Publication Data

US 2002/0047328 A1 Apr. 25, 2002

Related U.S. Application Data (63) Continuation-in-part of application No. 09/271,788, filed on Mar. 18, 1999, now Pat. No. 6,288,459.

(30) Foreign Application Priority Data

Mar. 18, 1998 (JP) .......................................... 10-068441
Dec. 11, 1998 (JP) .......................................... 10-352622

(51) Int. Cl.[7] .................. H02K 7/075; H02K 7/065; H04Q 7/14; H04Q 7/32
(52) U.S. Cl. ....................................................... 310/81
(58) Field of Search ............................... 310/51, 81, 42; 74/87; 29/596, 598; 340/407.1

(56) References Cited

U.S. PATENT DOCUMENTS

| 3,344,293 A | 9/1967 | Wahl ............................. 310/81 |
| 5,338,996 A | 8/1994 | Yamamoto ..................... 310/217 |
| 6,288,459 B1 * | 9/2001 | Furudate et al. ............... 310/42 |

FOREIGN PATENT DOCUMENTS

| JP | 6-98496 | 4/1994 | .......... H02K/7/075 |
| JP | 7-107699 | 4/1995 | .......... H02K/7/075 |
| JP | 7-184247 | 7/1995 | .......... H02K/7/075 |
| JP | 7-288946 | 10/1995 | .......... H02K/7/075 |
| JP | 8-111960 | 4/1996 | .......... H02K/7/075 |
| JP | 8-205466 | 8/1996 | .......... H02K/7/075 |
| JP | 10-313549 | 11/1998 | .......... H02K/7/075 |
| JP | 11-319711 | * 11/1999 | .......... H02K/7/075 |

* cited by examiner

Primary Examiner—Karl Tamai
(74) Attorney, Agent, or Firm—Brinks Hofer Gilson & Lione (57) ABSTRACT

A vibration-generating device having a weight that is formed semicircular in section and has a recess near an insertion hole of a shaft. The weight, after being inserted onto the shaft, is supported in an inclined position by a support member. A pressing member applies a pressure to the recess. Preferably, the pressure is offset from the rotational axis of the shaft.

20 Claims, 6 Drawing Sheets

VIBRATION GENERATING DEVICE HAVING A WEIGHT CAULKED TO A SHAFT

CROSS REFERENCE TO RELATED APPLICATION

This application is a continuation-in-part of U.S. patent application Ser. No. 09/272,788 filed Mar. 18, 1999 now U.S. Pat. No. 6,288,459 and entitled Vibration Generating Device Having A Weight Caulked To A Shaft And Method For Caulking A Weight To A Shaft, the disclosure of which is incorporated herein by reference.

BACKGROUND

The present invention relates to a vibration-generating device used in a game controller, a vibration controller, or a wireless device and to a method for mounting a weight to the vibration-generating device.

Figure 8:
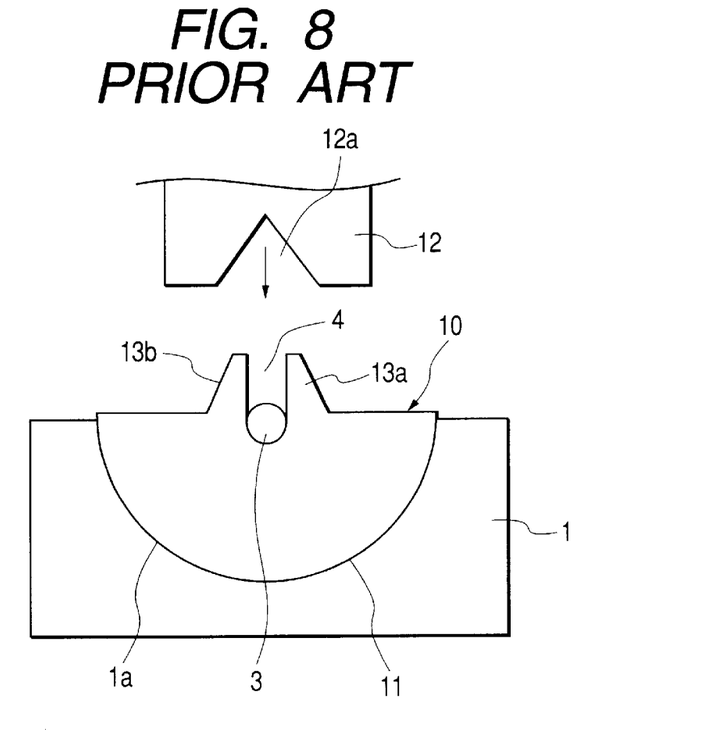
FIG. 8 is a front view of a conventional weight not mounted to a shaft.
Figure 9:
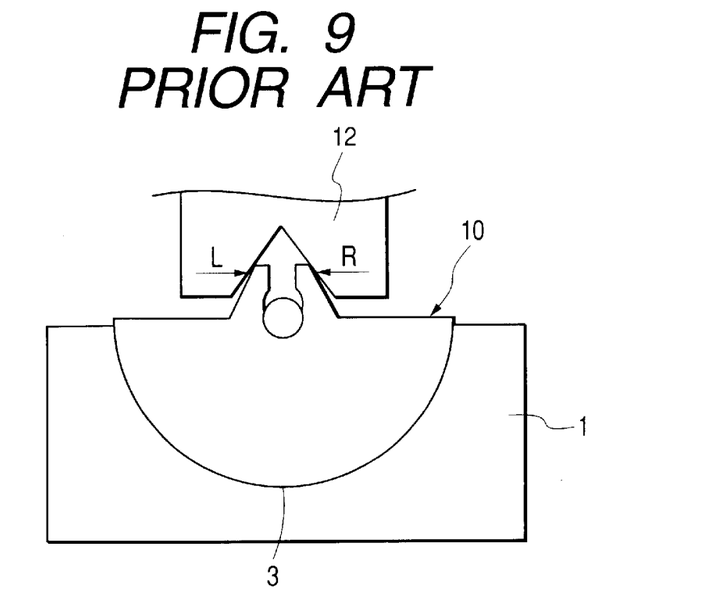
FIG. 9 is a front view of the conventional weight mounted to the shaft.

Some conventional weights include a body 11 of a semicircular columnar section having a U-groove 4 formed at the center in a diametric direction that receives a shaft 3. On both sides of the U-groove 4 linear projections 13a and 13b extend upwardly.

When the weight 10 is mounted on the shaft 3, the shaft 3 is inserted into the U-groove 4. A support block 1 supports the weight 10. A supporting surface within the support block 1 that has the same configuration as a perimeter of the weight 10 that supports a flat portion of the weight 10 at a level position.

A pressing member 12 having a recess 12a shown in triangular cross-section is lowered until the weight 10 is fastened to the shaft 3. The surface area of the recess 12a near the end of the pressing member 12 is smaller than the surface area of the projections 13a and 13b and the space that separates the projections 13a and 13b. The recess 12a of the pressing member 12 is pressed into contact with the edges of the projections 13a and 13b which bends the projections 13a and 13b inwardly as shown by the R and L arrows, which caulks the weight 10 to the shaft 3.

The conventional method shown in FIGS. 8 and 9 can be used when the weight 10 is produced of a relatively soft material such as copper. However, when the weight 10 is made of a relatively hard material such as iron, a much larger pressure is needed to mount the weight 10 to the shaft 3.

If an insufficient force is applied to the weight 10 by a conventional method, the weight 10 can be easily removed from the shaft 3 with a relatively small force. If the weight 10 is not properly secured to the shaft, the weight 10 can fall off the shaft 3 and produce an undesired noise or impair device operation.

As shown in FIGS. 8 and 9, a portion of an inside wall of the U-groove 4 is straight, and therefore, a large force can be needed to deform the projections 13a and 13b into a curved surface that encloses a portion of the shaft 3. If an insufficient force is applied, the projections 13a and 13b may not sufficiently enclose a portion of the shaft 3.

SUMMARY

In a preferred vibration-generating device, a weight has a shaft insertion hole of an approximately semicircular section that is partially open near the center of an upper edge of the weight. Recesses for caulking are located near the open portion of the insertion hole. With a shaft inserted within the insertion hole, a pressure is applied to at least one of the recesses or to an open-end side which fastens the shaft to the weight.

By the above-preferred method, the weight is firmly attached to the shaft with less pressure than the pressure used in some conventional methods. Furthermore, cost reduction can be realized when the weight is produced of a low-cost material such as iron. Furthermore, since some iron can be shaped to a desired accuracy and can be less likely to deform, the weight is less likely to fall off the shaft. Preferably, the insertion hole encloses more than about one-half of a cross-sectional circumference of the shaft. In some presently preferred embodiments, the insertion hole encloses about three quarters of the cross-sectional circumference of the shaft.

Preferably, the weight can be held in surface contact with the shaft. That is, the inner surface of the insertion hole is preferably about the same shape as the outer surface of the shaft. Preferably, a portion of the inner surface of the insertion hole contacts an outer curved surface of the shaft when the weight is secured to the shaft. Therefore, in comparison with some conventional weights having a U-groove, the presently preferred weight can be mounted more firmly to the shaft. Preferably a clearance between the inner surface of the insertion hole and the outer surface of the shaft is greater than or equal to about $1/100$ mm and less than or equal to about $8/100$ mm, and more preferably, greater than or equal to about $3/100$ mm and less than or equal to about $5/100$ mm. Preferably, the thickness between the recess and the inside wall surface of the insertion hole is between about 0.5 to less than about 1.0 times the shaft diameter.

The presently preferred method of mounting the weight to the vibration-generating device includes a process that inserts a weight onto the shaft, a process that supports the weight, and a process that applies a pressure to fasten the weight to the shaft. In the presently preferred method, the weight is of an approximately semicircular columnar section that has a shaft insertion hole partly open near the center of an upper edge of the weight. Preferably, at least one recess is positioned near the open portion of the insertion hole. After the shaft is inserted into the insertion hole, the weight is supported in an inclined position and a pressure is applied to one of the recesses or to the open end side near that recess by a curved end of a single ended pressing member. Preferably, the curvature of the curved end of the single ended pressing member matches or substantially matches the curvature of the concave shaped recesses. Preferably, the single ended pressing member exerts a pressure on the weight offset or distant from a rotational axis of the shaft.

According to the presently preferred method, the weight is mounted while supported by a support member. In this preferred embodiment, the support member supports the weight such that an upper edge portion of the weight is inclined relative to a horizontal plane or a horizontal surface of the support member. A pressure is applied to the supported weight by the single ended pressing member. In this preferred embodiment, the pressing member presses at least one of the recesses adjacent to the insertion hole or the open-end side near that recess. In this preferred embodiment, the pressure preferably conforms a portion of the inner surface of the insertion hole to an outer surface of the shaft. Preferably, the single ended pressing member applies a pressure in a substantially vertical direction that is offset or distant from the rotational axis of the shaft.

DESCRIPTION OF THE PRESENTLY PREFERRED EMBODIMENTS

Figure 1:
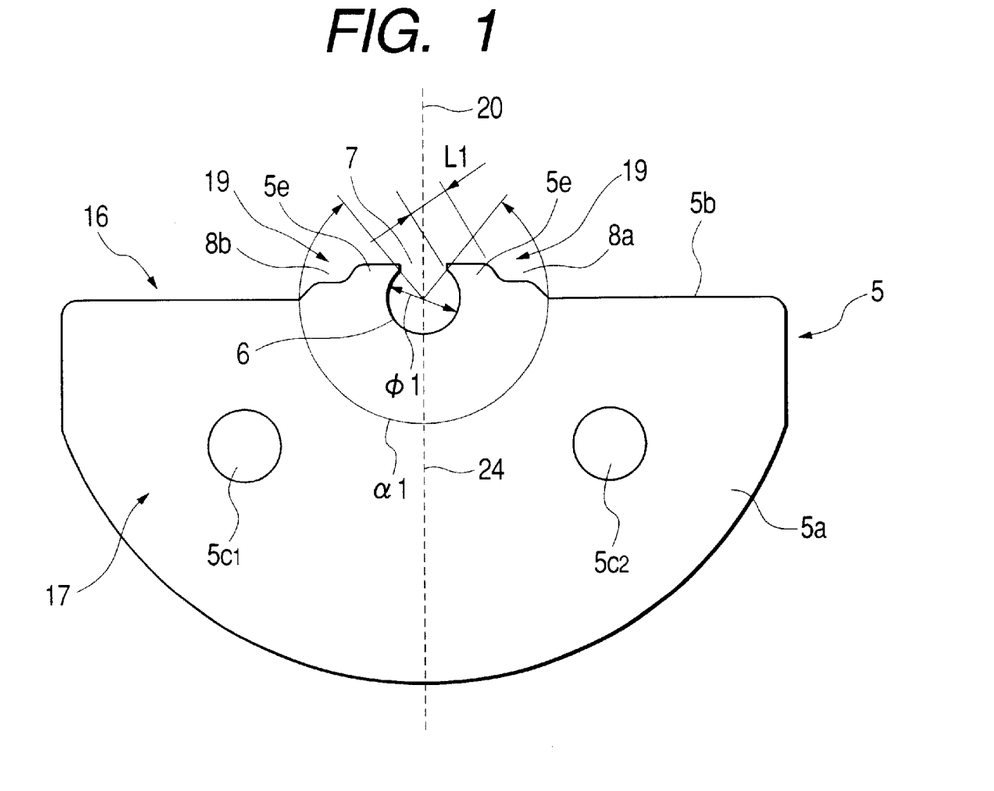
FIG. 1 is a front view of a presently preferred embodiment of a weight.

A weight 5 shown in FIG. 1 comprises a body 5a having a semicircular, columnar section. Preferably, the weight 5 includes projecting portions 5e that extend outwardly near a central portion of an upper edge 5b. As shown, the upper edge 5b is substantially flat. Preferably, an insertion hole 6 is positioned adjacent to the projecting portions 5e. Preferably, the insertion hole 6 is accessible through openings that pass through the upper surface 16, a first side face 17, and a second side face 18 of the weight 5. Preferably, the insertion hole 6 is not coincident with a center of gravity 24 of the weight 5 so that a centrifugal force that can act on the weight 5 is increased. The position of the insertion hole 6 can vary in alterative preferred embodiments to increase the forces that act on the weight 5 when the weight 5 is in motion. Preferably, the insertion hole 6 is dimensioned to receive a shaft 3.

Adjacent double curve surfaces 19 are positioned adjacent to the insertion hole 6 across from each other. Each of the double curve surfaces 19 comprise a recess 8a or 8b joined to a pair of convex surfaces. In cross-section, the double curves are formed by a curved unison of a concave and a pair of convex lines, although in alternative preferred embodiments the concave and the pair of convex lines can be coupled at varying angles. As shown in FIGS. 1–4, all of the concave surfaces that comprise the recesses 8a and 8b are positioned above the axis of rotation 21 of the shaft 3. As shown in FIG. 1, the double curve surfaces 19 are symmetrical about a plane 20 shown in cross-section that extends through or near a center of the insertion hole 6 along a portion of its diameter. In some alternative preferred embodiments, the plane 20 extends through or near the center of gravity 24 of the weight 5 that is preferably positioned below the shaft 3 when the weight 5 is not in motion. In yet another alternative preferred embodiment, the plane 20 extends through the axis of rotation 21 of a shaft 3 along a portion of a shaft diameter and in some alternative preferred embodiments through or near the center of gravity 24 of the weight 5.

In the presently preferred embodiment, the clearance between the inner surface of the insertion hole 6 and the outer surface of the shaft 3 is greater than or equal to about $1/100$ mm and less than or equal to about $8/100$ mm, and more preferably, is greater than or equal to about $3/100$ mm and less than or equal to about $5/100$ mm. Preferably, the thickness between the recesses 8a and 8b and the inner surface of the insertion hole 6 is between about 0.5 to about 1 times the diameter of the shaft 3.

In the weight 5 shown in FIG. 1, if ø1 is the diameter of the insertion hole 6, L1 is a clearance between one of the recesses 8a or 8b and the insertion hole 6, and α1 is the angle of the insertion hole 6 enclosing the shaft 3, then in one exemplary embodiment ø1 is about 2.01 mm, L1 is about 1.1 mm, and α1 is about 263 degrees. In this exemplary embodiment, L1 is about 0.5 the diameter if the shaft ø1.

Figure 2:
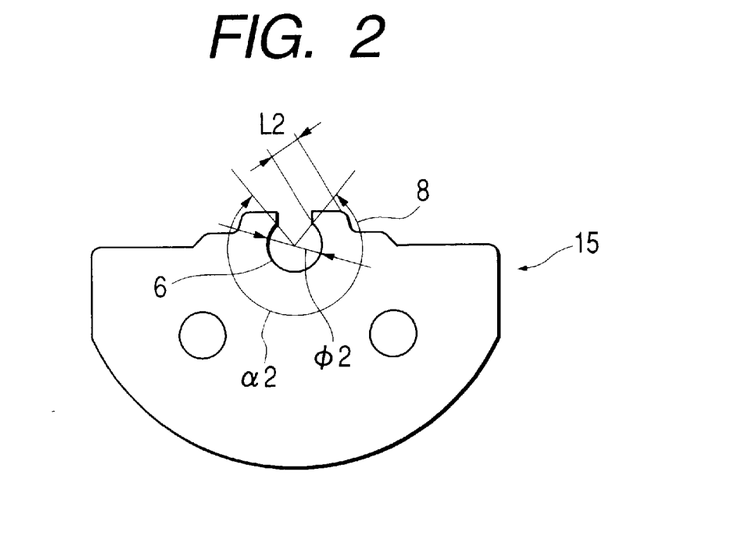
FIG. 2 is a front view of an alternative presently preferred embodiment of the weight.

An alternative presently preferred embodiment is shown in FIG. 2 in which a weight 15 is smaller than the weight 5 shown in FIG. 1. If ø2 is the diameter of the insertion hole 6, L2 is a clearance between one of the recesses 8a and 8b and the insertion hole 6, and α2 is the angle of the insertion hole 6 enclosing the shaft 3, then in a second exemplary embodiment, ø2 is about 1.52 mm, L2 is about 0.8 mm, and α2 is about 276 degrees. In the weight 15, L2 is formed at a rate of 0.5 the diameter of the shaft ø2.

The exemplary weights 5 and 15 shown in FIGS. 1 and 2 are preferably made of a relatively hard material such as iron or the like or SECC. Preferably, the material can be shaped to a high degree of accuracy and in some presently preferred embodiments can resist deformation. It should be noted that the explained features and modification of the weight 5 described herein are further features or modifications of the weight 15 shown in FIG. 2.

Figure 6:
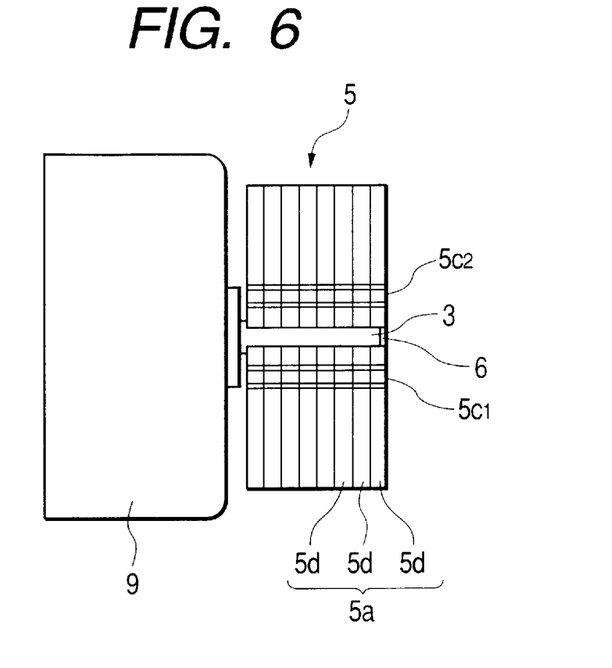
FIG. 6 is a top sectional view of the presently preferred weight mounted to the shaft.
Figure 6A:
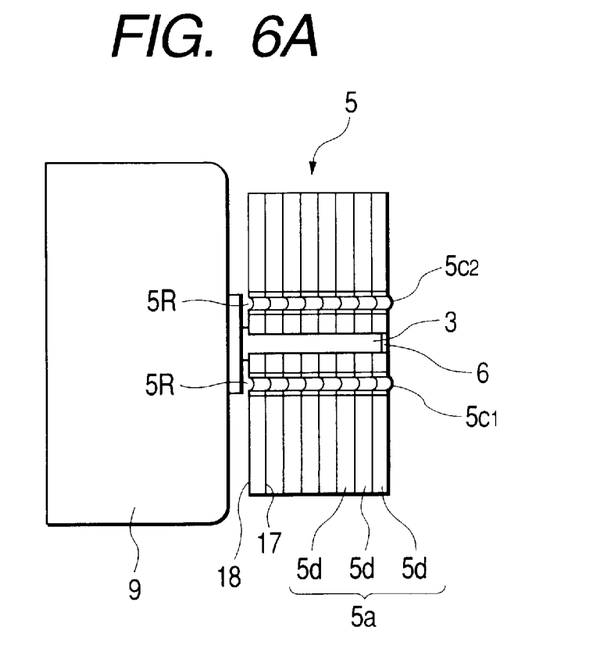
FIG. 6A is a second top sectional view of the presently preferred weight mounted to the shaft.

As shown in FIGS. 6 and 6A, the weight 5 preferably comprises a plurality of thin plates 5d stacked in column along a portion of the shaft 3. Preferably, each of the thin plates 5d which form the body 5a of the weight 5 is provided with a pair of round or substantially round projections 5c1, 5c2. Preferably, the projections 5c1 and 5c2 are symmetrically positioned about the plane 20 shown in FIG. 1 that passes near the center of the insertion hole 6 and/or through the rotational axis of the shaft 3. Moreover, preferably the projections 5c1 and 5c2 are positioned at a substantially equal radial distance from the center of the insertion hole 6 and/or the rotational axis 21 of the shaft 3. Moreover, in one presently preferred embodiment, the distance between at least one selected recess e.g., 8a and a center of one selected projection e.g., 5c2 is shorter than a distance that separates the center of the selected projection e.g. 5c2 and the center of the insertion hole 6 or the rotational axis of the shaft 3. Of course, the projections 5c1 and 5c2 can assume many other shapes and can assume many other positions on the first side face 17 of the weights 5 and 15 in alternative preferred embodiments. Many other alternatives are possible. For example, one or more projections can project from the second side face 18 or from both the first and second side faces 17 and 18 of selected thin plates 5d in other alternative preferred embodiments.

Preferably, projections 5c1, 5c2 are formed by pressing a second side face 18 of the weight 5 in this presently preferred embodiment. As shown in FIG. 6A, preferably the recesses 5R that result from making the projections 5c1 and 5c2 in the thin plates 5d are dimensioned to receive adjacent projections 5c and 5c2 that extend from an adjacent thin plate when the thin plates 5d are inserted onto the shaft 3. Preferably, the weight 5 shown in FIG. 6A is formed by laminating the thin plates 5d while pressing the projections 5c1, 5c2. Alternatively, many other processes can form the projections 5c1 and 5c2.

To mount the weight 5 to the shaft 3, the shaft 3 is inserted into the insertion hole 6. While FIG. 3 illustrates the shaft 3 coupled to a motor 9, the shaft 3 may or may not be coupled to other components in alternative preferred embodiments.

Figure 3:
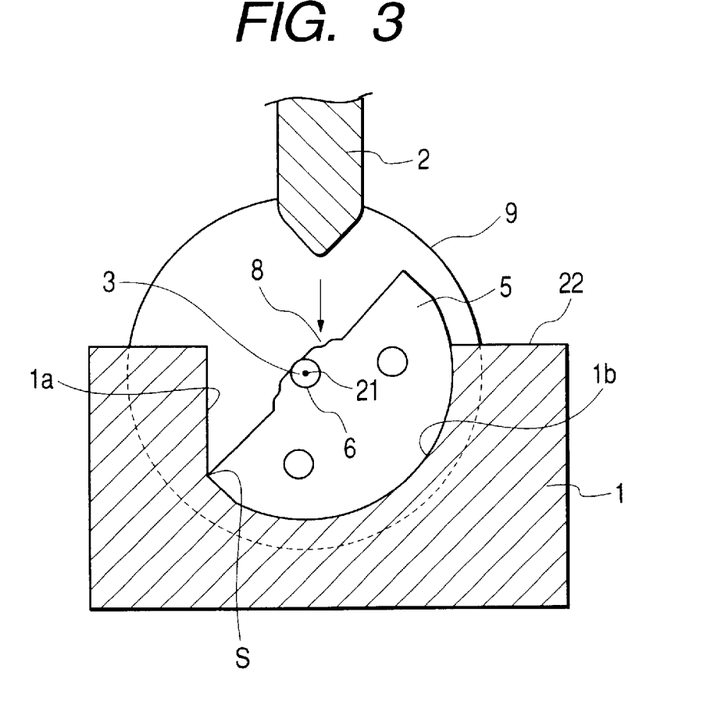
FIG. 3 is a front view of a presently preferred pressing member, shaft, and support member.

In the presently preferred embodiment shown in FIG. 3, the insertion hole 6 encloses more than about one half of the cross-sectional circumference of the shaft 3. In other words, the insertion hole encloses more than about a 180 degree of the cross-sectional circumference of the shaft 3. The presently preferred enclosure prevents the shaft 3 from passing through the opening 7 even when the shaft 3 is not caulked to the weight 5.

As shown in FIG. 3, a support member 1 supports the weight 5 in an inclined position relative to a substantially horizontal plane that preferably lies coincident to an upper surface 22 of the support member 1. The support member 1 preferably includes a recess passing through the upper surface 22 of the support member 1. Preferably, the recess is framed by a continuous substantially planar side $1a$ that is joined to a continuous curved lower and side surface $1b$. Preferably, the curved surface $1b$ is concave having a contour that substantially matches the convex or continuous curved portion of the weight 5. As shown, when the weight 5 is received within the recess of the support member 1, an end portion abuts a lower portion of the substantially planar side $1a$ at a point 5. Preferably, the support member 1 secures the weight 5 in an inclined position.

Figure 4:
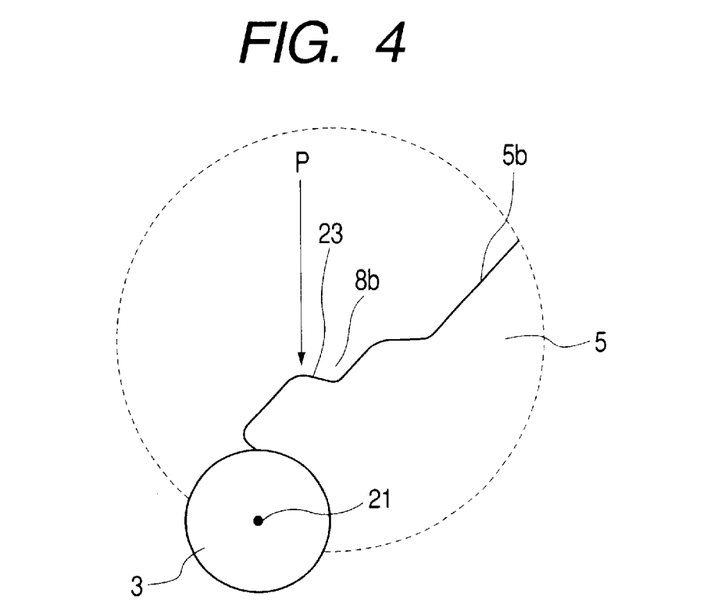
FIG. 4 is an enlarged sectional view of the presently preferred weight and shaft before mounting.

In the presently preferred process, the weight 5 is supported in the recess of the support member 1. Preferably, the pressing member 2 is positioned above the weight 5 so that when the pressing member 2 is lowered the pressing member 2 applies a caulking pressure that secures the weight 5 to the shaft 3. Preferably, the pressing member 2 is a single ended device having a gradually tapered or curved end. Preferably, the curved end has a curvature that substantially matches the concave shape of the recesses $8a$ and $8b$. In this presently preferred embodiment, the matching shapes of the recesses $8a$ and $8b$ and curved end concentrates a force that contours the inner surface of the insertion hole to the entire or a portion of outer surface of the shaft 3. Preferably, the pressing member 2 has a sufficient thickness to transfer the concentrated force to the weight 5. As shown in FIG. 4, the pressing member 2 is fed in a substantially vertical downward direction as shown by the arrow P directed toward an open end side 23 near the shaft 3 and near the recess $8b$. When a pressure is transferred from the pressing member 2 to the open-end side 23 adjacent to the recess $8b$ and to the shaft 3, the pressure is applied in a direction illustrated by the arrow P. That is, the pressure is applied to a portion of the weight 5 offset or distant from the rotational axis 21 of the shaft 3.

Figure 5:
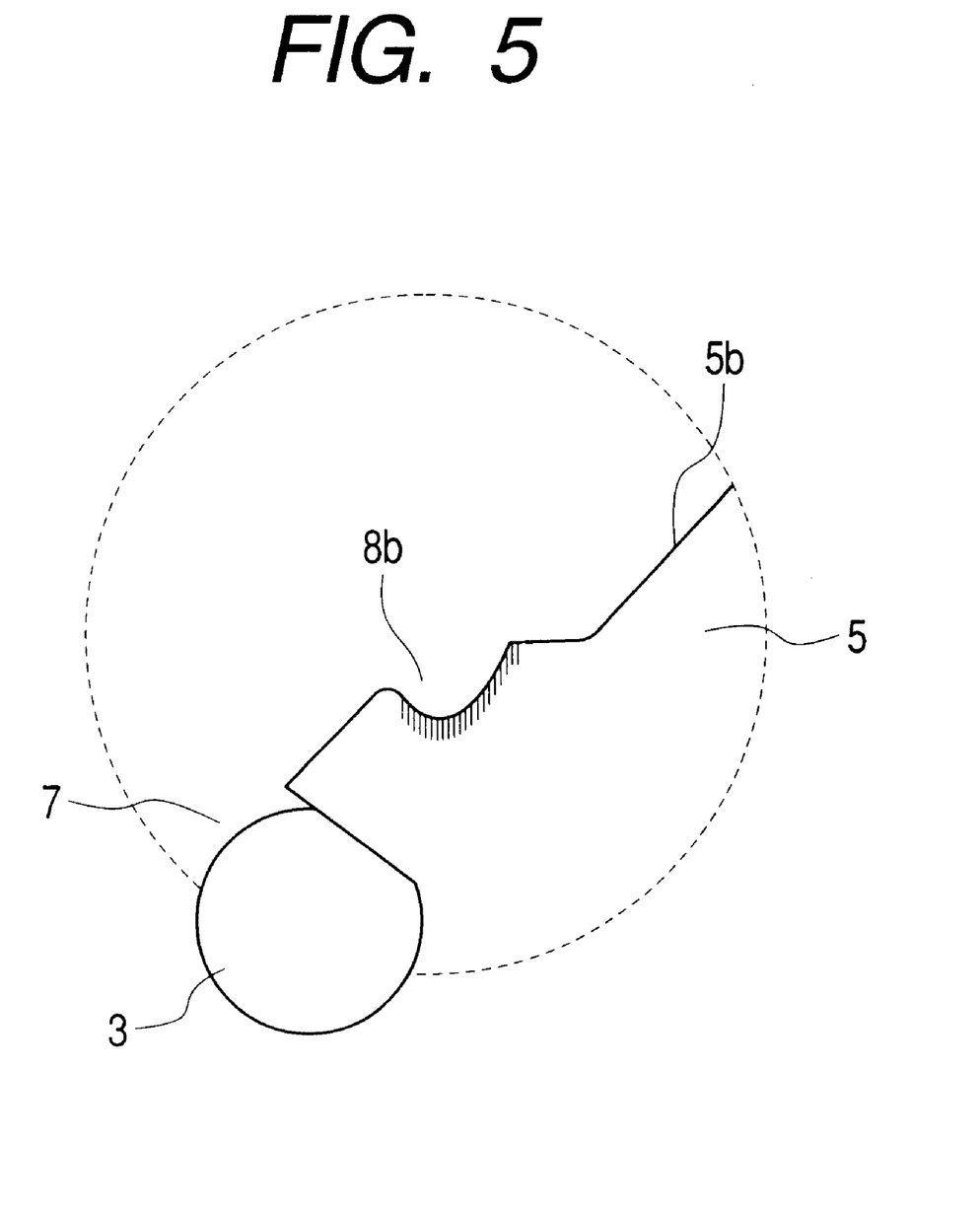
FIG. 5 is an enlarged sectional view of the presently preferred weight mounted to the shaft.

FIG. 5 is a partially enlarged front sectional view showing the shape of the recess $8b$ after a pressing member 2 applies a pressure. As the pressure is applied to the weight 5, the pressure transferred by the pressing member 2 depresses the recess $8b$. A thick part of the projecting portions $5e$ between the recess $8b$ and the inner surface of the insertion hole 6 is pressed against a portion of the outer surface of the shaft 3. A portion of the inner wall of the insertion hole 6 near the opening 7 is pressed towards the shaft 3, and in some instances, presses or comes into contact with the shaft 3. In this presently preferred embodiment, the inner surface of the insertion hole 6 is preferably formed or configured to substantially the same shape as a portion of the outer surface or circumference of the shaft 3. In one presently preferred embodiment, a portion of the inner surface of the insertion hole 6 contacts the shaft 3 at about two surfaces along a portion of the circumference or outer surface of the shaft 3. Thus, the weight 5 is firmly caulked to the shaft 3. In the above-described presently preferred embodiment, the opening 7 can function as a clearance which allows the inside wall surface of the insertion hole 6 to be configured around a portion of the shaft 3 with less resistance.

Figure 7A:
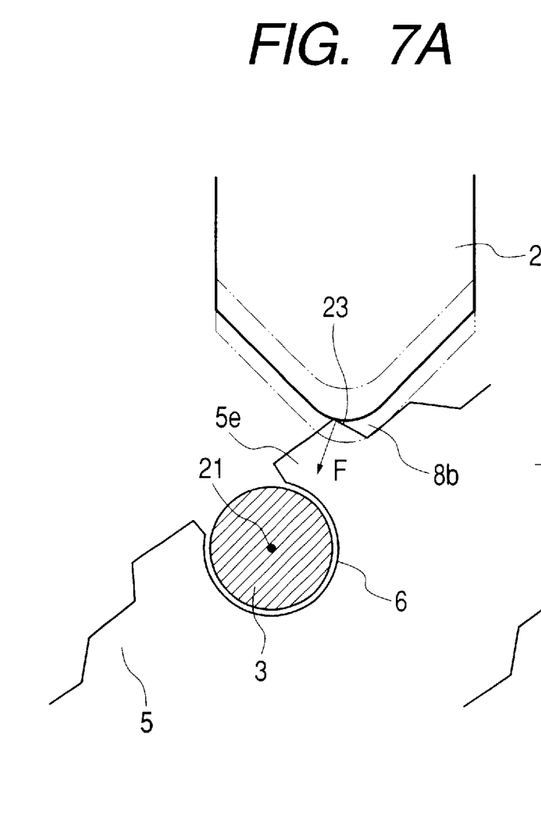
FIGS. 7A to 7C are sectional perspective views of the presently preferred process caulking the presently preferred weight to the preferred shaft.
Figure 7B:
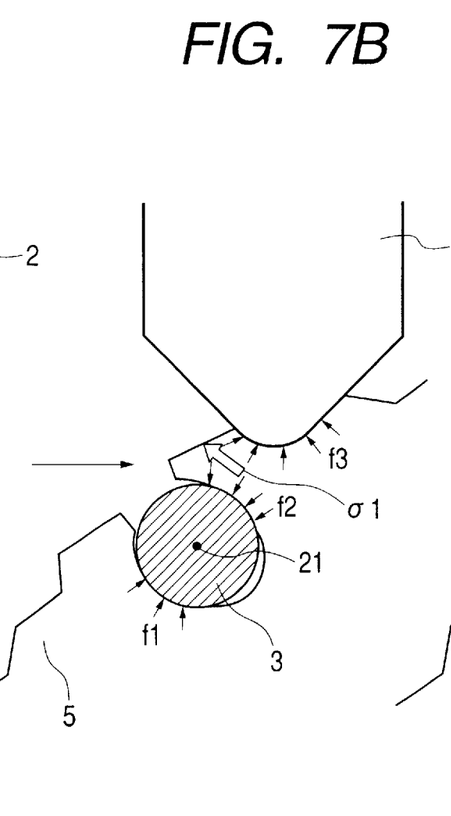
Figure 7C:
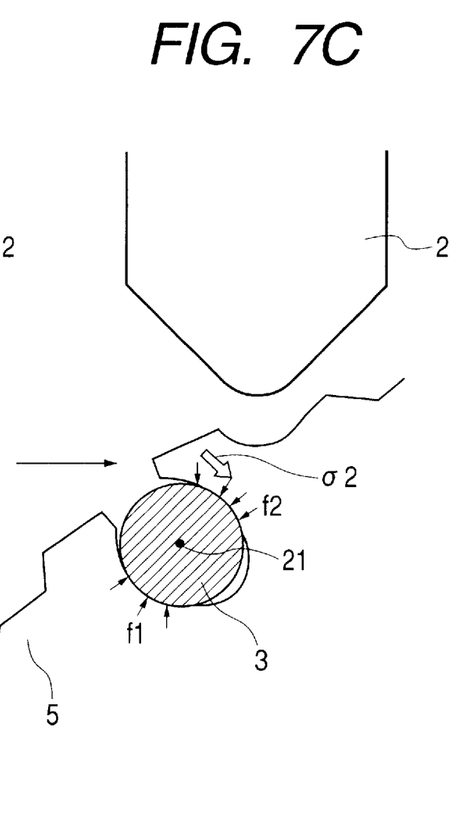

FIGS. 7A to 7C illustrate explanatory views of one presently preferred process for caulking the weight 5 to the shaft 3. FIG. 7A shows the weight 5 as pressure is initially applied by the pressing member 2; FIG. 7B illustrates the weight 5 as pressure continues to be applied by the pressing member 2; and FIG. 7C illustrates the weight 5 as the pressing member 2 is removed. In FIG. 7A, the pressing member 2 descends from above the recess $8b$, initially coming into contact with the open end side 23 near the recess $8b$ before seating within the recess $8b$. As shown in FIG. 7A, initially the pressure vector F is directed toward the shaft 3 even though the pressing member 2 is offset or distant from the rotational axis 21 of the shaft 3.

As shown in FIG. 7B, with a substantially vertical pressure applied by the pressing member 2, stress vectors f1 and f2 are directed toward the shaft 3 which secures the weight 5 to the shaft 3. Moreover, a stress vector f3 is produced by the elastic force of the weight 5 which counteracts or pushes back the force of the pressing member 2. Furthermore, with the pressure applied by the pressing member 2, a strain $\sigma 1$ is produced within the weight 5 towards the projection $5e$ that now further encloses the shaft 3.

In FIG. 7C, the pressing member 2 moves away from the weight 5. When the pressing member 2 moves away from the weight 5, the stress f3 is released by the elastic force of the weight 5 and the strain $\sigma 1$ is projected as $\sigma 2$ springs back in the illustrated direction by the elasticity of the weight 5. The presently preferred process fastens the shaft 3 within the insertion hole 6 which maintains a caulking engagement.

When a desired caulking engagement is obtained, the contact surface areas between the pressing member 2 and the weight 5 gradually increase. As shown FIGS. 7A and 7B as pressure in increased, the pressing member 2 seats within the recess $8b$. Accordingly, the process allows two points of pressure to be applied to the weight 5 selected by the amount of pressure transferred by the pressing member 2. Accordingly, by controlling the pressure applied by the pressing member 2, the location and force of the caulking is controlled in this presently preferred embodiment. If a desired pressure is known, no control is needed to select the pressure levels. Accordingly, it is possible to set the caulking pressure by controlling a fluid pressure such as by an air pressure produced by an air cylinder.

Preferably, the presently preferred vibration generating embodiments described-above can be incorporated within a wireless device, a television, a computer, a controller, or a personal computer game controller, for example. In use, the shaft 3 driven by the motor 9 or by other means rotates the weight 5 depending on a desired setting. In a game controller, for example, the rotation can vary with an image, and thus, vary vibrations with each image.

In the presently preferred embodiments described-above, the invention is not limited to the exemplary dimensions described above. For example, the angle of enclosure can change with the size of the weight 5 and the diameter of the shaft 3. Moreover, the degree of inclination of the weight 5 can be adjusted by controlling the length of the substantially planar side $1a$ of the supporting member 1. For example, when a smaller angle of inclination is desired with respect to a substantially horizontal plane, a shorter substantially planar side $1a$ can be used. When a larger angle of inclination is desired, a longer substantially planar side $1a$ can be used. Moreover, it should be noted in the presently preferred embodiments that no projections extend from the continuous substantially planar side 1a and curved lower and side surfaces 1b that bound the recess of the support member 1. In alternative preferred embodiments, extended and/or angled surfaces, projections positioned within the recess of the support member 1 or other means for securing the weight 5 to the support member 1 can be used.

The invention is not limited to a particular method of applying a concentrated force or devices made from such methods. Many alternatives are possible, including applying a concentrated force to the second recess 8a and/or to the adjacent open ended side near that recess 8a through a single curved or angular ended pressing member 2. Moreover, in some alternative embodiments only a selected number of thin plates have one or more projections. Moreover, the recesses 5R positioned on the side faces of the weight 5 are not limited to recesses 5R formed or positioned directly behind the projections. Moreover, the first and second side faces 17 and 18 and upper edge 5b are not limited to the illustrated substantially flat surfaces as many other contours can be used in alternative preferred embodiments.

While various presently preferred embodiments of the invention have been described, it will be apparent to those of ordinary skill in the art that many more embodiments and implementations are possible that are within the scope of this invention. Accordingly, the invention is not to be restricted except in light of the claims and their equivalents.

What is claimed is:

1. A vibration generating device, comprising:
   a shaft;
   a weight having a hole that is approximately semicircular in section and partly open near a center in a radial direction;
   a recess for caulking located near the open part of the insertion hole, the recess for caulking comprising a concave surface, all of the concave surface being positioned above a rotational axis of the shaft;
   wherein the shaft is coupled to the weight through the insertion hole that encloses only a portion of an outer surface of the shaft; and
   wherein the weight has a plurality of projections disposed below the recess and are separated by a plane that extends through the rotational axis of the shaft and substantially through a center of gravity of the weight.

2. The vibration generating device of claim 1 wherein the recess is formed on an upper surface of the weight and a distance between a first projection and the recess is smaller than a second distance that separates the first projection and the center of rotational axis of the shaft.

3. The vibration generating device of claim 1 further comprising double curve surfaces positioned adjacent to the open part.

4. The vibration generating device of claim 3 wherein at least one double curve surface comprises a concave line and a plurality of convex lines when viewed in cross-section.

5. A vibration generating device according to claim 1 wherein an inner surface of the weight partially encloses more than about one half of a cross-sectional circumference of the shaft and the weight further comprises a plurality of plates each having a first side face, wherein a selected number of thin plates have at least one projection extending from the first side face that is coupled a recess formed within an adjacent thin plate.

6. A vibration generating device according to claim 1, wherein an inner surface of the weight partially encloses the insertion hole having a clearance with the shaft greater than or equal to about $1/100$ mm and less than or equal to about $8/100$ mm.

7. A vibration generating device according to claim 1 wherein a thickness between the recess and an inner wall surface that partially encloses the insertion hole is between about 0.5 to 1. times a diameter of the shaft.

8. A vibration generating device according to claim 1, wherein each of the projections are positioned at a substantially equal radial distance from a rotational axis of the shaft and are disposed upon the first side face.

9. A vibration generating device according to claim 8, wherein the weight further comprises a second side face positioned directly across from the first side face, the second side face having a substantially flat surface and a plurality of second recesses, wherein each of the second recesses are dimensioned to receive only one of the plurality of projections, respectively.

10. A vibration generating device according to claim 8, wherein the weight comprises a plurality of thin plates coupled together such that the projections of at least one thin plate are aligned within second recesses of at least another thin plate.

11. A vibration generating device and a supporting member, comprising:
    a shaft;
    a weight having a hole that is approximately semicircular in section and partly open near a center in a radial direction;
    a recess for caulking located near the open part of the insertion hole, the recess for caulking comprising a concave surface, all of the concave surface being positioned above a rotational axis of the shaft;
    a supporting member having a recess, the recess being bounded by a substantially planar side that couples a concave curve near an end of the substantially planar side that abuts an end of the weight;
    wherein the shaft is coupled to the weight through the insertion hole such that the weight encloses only a portion of an outer surface of the shaft; and
    wherein the weight has at least one projection disposed below the recess and offset from a plane that extends through a center of a rotational axis of the shaft and through a center of gravity of the weight.

12. The vibration generating device of claim 11 further comprising double curve surfaces positioned adjacent to the open part.

13. A vibration generating device and a supporting member, comprising:
    a shaft;
    a weight having a hole that is approximately semicircular in section and partly open near a center in a radial direction;
    a recess for caulking located near the open part of the insertion hole, the recess for caulking comprising a concave surface, all of the concave surface being positioned above a rotational axis of the shaft;
    a supporting member having a recess, the recess being bounded by a substantially planar side that couples a concave curve at an end of the weight;
    wherein the weight has at least one projection disposed below the recess and offset from a plane that extends through a center of a rotational axis of the shaft and through a center of gravity of the weight, and wherein a distance between said at least one projection and the recess is smaller than a second distance between said at least one projection and the rotational axis of the shaft.

14. A vibration generating device and a supporting member, comprising:

a shaft;

a weight having a hole that is approximately semicircular in section and partly open near a center in a radial direction;

double curve surfaces positioned adjacent to the open part, each of the double curve surfaces comprising a recess joined to a pair of convex surfaces;

a supporting member having a recess bounded by a substantially planar side that couples a concave surface at an end of the weight;

wherein the shaft is coupled to the weight through the insertion hole that encloses only a portion of an outer surface of the shaft; and wherein the weight has a plurality of projections disposed below the recess and said shaft separated by a plane that extends through a center of a rotational axis of the shaft and through a center of gravity of the weight.

15. A vibration generating device of claim 14 wherein the double curve surfaces are symmetrically positioned about the plane on an upper edge of the weight.

16. A vibration generating device of claim 14 wherein the plurality of projections are symmetrically positioned about the plane on a side surface of the weight.

17. A vibration generating device of claim 14 wherein the side surface is substantially flat.

18. A vibration generating device, comprising:

a shaft;

a weight having a hole that is approximately semicircular in section and partly open near a center in a radial direction;

a recess for receiving a pressure that causes the weight to couple the shaft is located near the open part of the insertion hole, the recess comprising a concave surface, all of the concave surface being above a substantially flat perimeter surface of the weight;

wherein the shaft is coupled to the weight through the insertion hole that encloses only a portion of an outer surface of the shaft; and wherein the weight has a plurality of projections disposed below the recess and are separated by a plane that extends through the rotational axis of the shaft and substantially through a center of gravity of the weight.

19. A vibration generating device of claim 18 wherein the lowest point of the concave surface being positioned above a rotational axis of the shaft.

20. A vibration generating device of claim 18 wherein the weight comprises a plurality of plates each having a first and a second face, wherein a selected number of plates have at least one projection extending from the first face coupled to a second recess formed within the second face of an adjacent plate.

* * * * *